(12) United States Patent
Bayless

(10) Patent No.: US 6,833,191 B2
(45) Date of Patent: Dec. 21, 2004

(54) MICROENCAPSULATED PARTICLES AND PROCESS FOR MANUFACTURING SAME

(75) Inventor: Robert G. Bayless, Marietta, GA (US)

(73) Assignee: Encap Technologies, LLC, Atlanta, GA (US)

( * ) Notice: Subject to any disclaimer, the term of this patent is extended or adjusted under 35 U.S.C. 154(b) by 18 days.

(21) Appl. No.: 10/298,419

(22) Filed: Nov. 14, 2002

(65) Prior Publication Data

US 2004/0130045 A1 Jul. 8, 2004

Related U.S. Application Data

(63) Continuation-in-part of application No. 09/989,359, filed on Nov. 20, 2001, now Pat. No. 6,562,460.

(51) Int. Cl.[7] .......................... B32B 15/02; B01J 13/02
(52) U.S. Cl. .......................... 428/402.24; 428/402.21; 428/403; 428/690; 264/4.1; 264/4.3; 264/4.33; 264/4.4
(58) Field of Search .................. 428/402.21, 402.24, 428/403, 690; 264/4.1, 4.3, 4.33, 4.4

(56) References Cited

U.S. PATENT DOCUMENTS

| 3,155,590 A | 11/1964 | Miller et al. |
|---|---|---|
| 3,415,758 A | 12/1968 | Powell et al. |
| 3,565,818 A | 2/1971 | Bayless et al. |
| 3,574,133 A | 4/1971 | Bayless et al. |
| 3,576,660 A | 4/1971 | Bayless et al. |
| 3,629,140 A | 12/1971 | Bayless et al. |
| 3,674,704 A | 7/1972 | Bayless et al. |
| 3,726,803 A | 4/1973 | Bayless et al. |
| 3,748,277 A | 7/1973 | Wagner |
| 3,755,190 A | 8/1973 | Hart et al. |
| 3,816,331 A | 6/1974 | Brown, Jr. et al. |
| 3,922,373 A | 11/1975 | Bayless |
| 3,985,719 A | 10/1976 | Hoyt et al. |
| 4,073,946 A | 2/1978 | Bayless |
| 4,107,071 A | 8/1978 | Bayless |
| 4,152,483 A | 5/1979 | Kanda et al. |
| 4,195,645 A | 4/1980 | Bradley, Jr. et al. |
| 4,377,621 A | 3/1983 | Hart et al. |
| 4,464,434 A | 8/1984 | Davis |
| 4,508,760 A | 4/1985 | Olson et al. |
| 5,744,233 A | 4/1998 | Opitz et al. |
| 5,856,009 A | 1/1999 | Nishio et al. |
| 5,908,698 A | 6/1999 | Budd |
| 5,968,698 A | 10/1999 | Honda |
| 6,064,150 A | 5/2000 | Klinedinst et al. |

OTHER PUBLICATIONS

*Encyclopaedic Dictionary of Physics*; J. Thewlis, Editor–in–Chief; pp. 368–372 (1962).
*IRE Transactions on Electron Devices*; vols. 4–6; "Bibliography on Electroluminescence and Related Topics"; Henry F. Ivey; pp. 203–215 (1957–1959).
*Electrochemical Society Journal*, vol. 108; "Bibliography on Electroluminescence and Related Topics, Part II"; Henry F. Ivey; pp. 590–599 (1961).
*Electrochemical Technology*; vols. 1–2; "Bibliography on Electroluminescence and Related Topics", Part III; Henry F. Ivey (1963–1964).
*Electroluminescence*; H.K. Henisch; Pergamon Press (1962).
*Advances in Electronics and Electron Physics*; "Electroluminescence and Related Effects"; Henry F. Ivey; Supplement I; Academic Press (1963).

Primary Examiner—Samuel A. Acquah
(74) Attorney, Agent, or Firm—Foley & Lardner LLP

(57) ABSTRACT

Microencapslated particles having improved resistance to moisture and extended release capabilities are produced by microencapsulating the particles in a film-forming, cross-linked, hydrolyzed polymer.

32 Claims, 2 Drawing Sheets

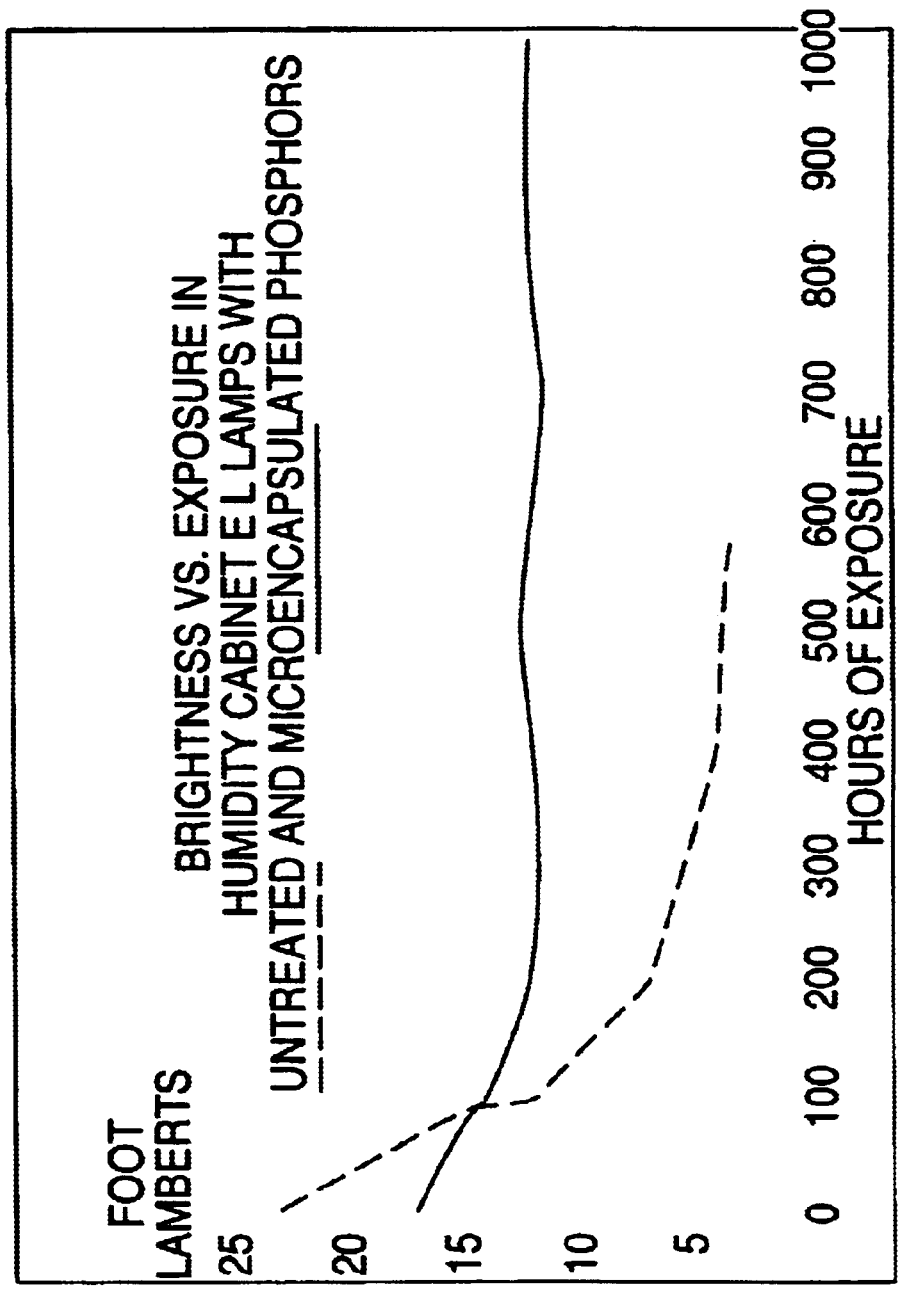

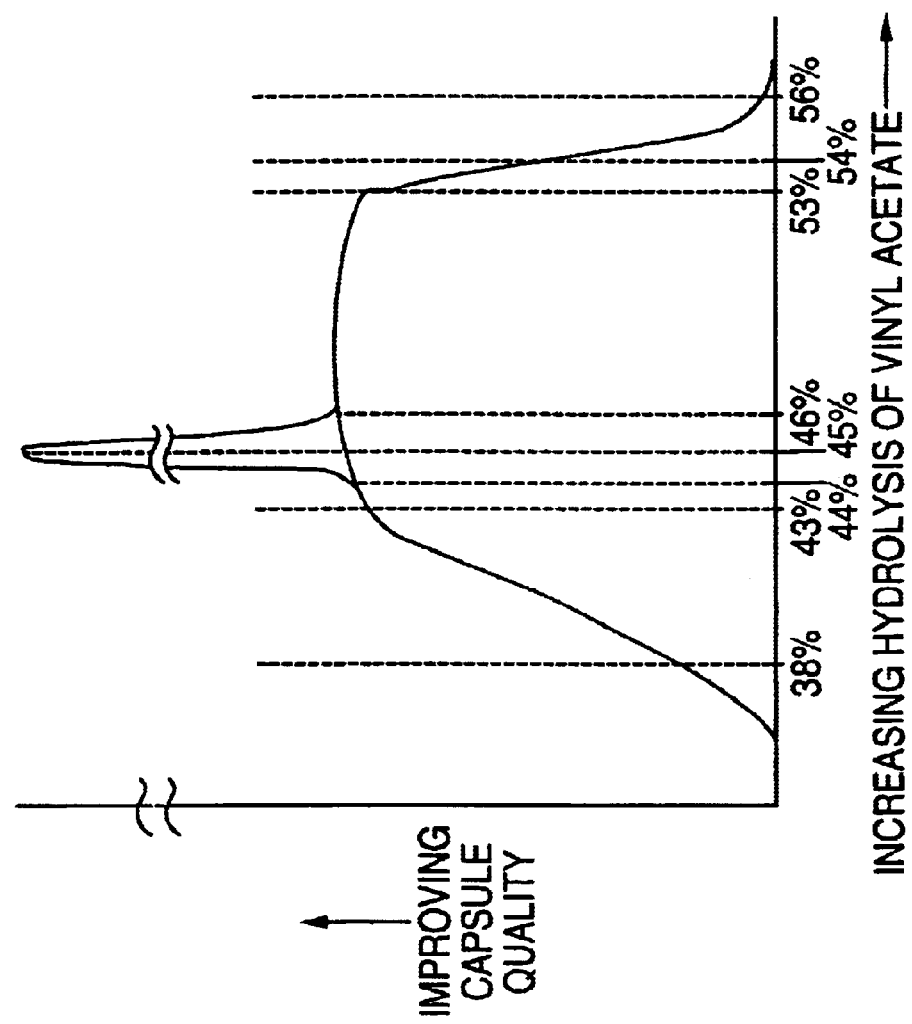

US 6,833,191 B2

MICROENCAPSULATED PARTICLES AND PROCESS FOR MANUFACTURING SAME

This application is a continuation-in-part of U.S. patent application Ser. No. 09/989,359, filed Nov. 20, 2001 now U.S. Pat. No. 6,562,460.

TECHNICAL FIELD

This invention relates to microencapsulated particles. In a more specific aspect, this invention relates to microencapsulated particles that are useful in electroluminescent applications. This invention also relates to a process for the microencapsulation of these particles.

This invention will be described in detail with specific reference to the microencapsulation of phosphor particles. However, this invention will be understood as applicable to the microencapsulation of other substance particles, such as pharmaceuticals, organic solvents, organic oils, pigments, dyes, epoxy resins, inorganic salts, etc.

In addition, this invention is applicable to the microencapsulation of polymer (or polymeric) light-emitting diodes (also referred to as PLEDs) and to the microencapsulation of organic light-emitting diodes (also referred to as OLEDs).

In general terms, PLEDs are thin film displays that are created by sandwiching an undoped conjugated polymer between two proper electrodes at a short distance. The polymer emits light when exposed to electricity. PLEDs enable fill spectrum color displays.

In general terms, OLEDs are display devices that sandwich carbon-based films between two charged electrodes, one a metallic cathode and one a transparent anode, usually being glass. The organic films consist of a hole-injection layer, a hole-transport layer, an emissive layer and an electron-transport layer. When voltage is applied to the OLED cell, the injected positive and negative charges recombine in the emissive layer and create electroluminescent light.

BACKGROUND OF THE INVENTION

Microencapsulated particles are known in the prior art. Bayless et al. U.S. Pat. No. 3,674,704 (1972) discloses a process for manufacturing minute capsules, en masse, in a liquid manufacturing vehicle wherein the capsules contain water or aqueous solutions. This patent discloses a specific process for manufacturing minute capsules wherein the capsule wall material is poly(ethylene-vinyl acetate) that is hydrolyzed to a narrowly specified degree (38–50 percent hydrolyzed).

Bayless U.S. Pat. No. 4,107,071 (1978) discloses microcapsules having a capsule core material surrounded by a relatively impermeable, densified protective wall and also discloses a process of manufacturing such microcapsules.

General encapsulating processes which utilize a liquid-liquid phase separation to provide a capsule wall material which envelops the capsule core material to be encapsulated are disclosed in Miller et al. U.S. Pat. No. 3,155,590; Powell et at. U.S. Pat. No. 3,415,758; and Wagner et al. U.S. Pat. No. 3,748,277.

Other prior art references disclose the encapsulation of electroluminescent phosphors; for example, see Budd U.S. Pat. No. 5,968,698 (1999). Additionally, the prior art discloses the coating of luminescent powders with a coating which comprises silicon dioxide; see Opitz et al. U.S. Pat. No. 5,744,233(1998).

Phosphor particles are used in a variety of applications, such as flat panel displays and decorations, cathode ray tubes, fluorescent lighting fixtures, etc. Luminescence or light emission by phosphor particles may be stimulated by applications of heat (thermoluminescence), light (photoluminescence), high energy radiation (e.g., x-rays or e-beams) or electric fields (electroluminescence).

For various reasons, the prior art fails to provide microencapsulated particles having the desired properties of impermeability to moisture and extended release capabilities. Thus, there is a need in the industry for microencapsulated particles having significantly improved properties.

SUMMARY OF THE INVENTION

Briefly described, the present invention provides microencapsulated particles which have an increased resistance to the adverse effects of moisture and which are able to function over an extended period of time (i.e., extended release capabilities). The present invention also provides a process for the microencapsulation of these particles.

The above-described advantages of the microencapsulated particles of this invention are evident when compared to similar microencapsulated particles manufactured according to the prior art (that is, not manufactured according to the present invention).

As used in this application, the following terms have the indicated definitions:

"Impermeability to moisture"—the ability to prevent or substantially eliminate the intake of moisture and thereby avoid the adverse effects of moisture.

"Improved"—as compared to microencapsulated particles that are disclosed in the prior art and are not microencapsulated according to the present invention.

As will be seen in greater detail below, the microencapsulated particles of this invention have other characteristics that are either equivalent to, or significantly improved over, the corresponding characteristics of the prior art microencapsulated particles.

Accordingly, an object of this invention is to provide microencapsulated particles.

Another object of this invention is to provide microencapsulated particles having improved impermeability to moisture.

Another object of this invention is to provide microencapsulated particles having extended release capabilities.

Another object of this invention is to provide microencapsulated phosphor particles.

Another object of this invention is to provide microencapsulated polymer light-emitting diodes.

Another object of this invention is to provide microencapsulated organic light-emitting diodes.

Still another object of this invention is to provide microencapsulated phosphor particles having improved impermeability to moisture.

Still another object of this invention is to provide microencapsulated phosphor particles having extended release capabilities.

Still another object of this invention is to provide a process for the microencapsulation of particles.

Still another object of this invention is to provide a process for the microencapsulation of particles to produce microencapsulated particles having improved impermeability to moisture.

Still another object of this invention is to provide a process for the microencapsulation of particles to produce microencapsulated particles having extended release capabilities.

Yet still another object of this invention is to provide a process for the microencapsulation of phosphor particles.

Yet still another object of this invention is to provide a process for the microencapsulation of polymer light-emitting diodes.

Yet still another object of this invention is to provide a process for the microencapsulation of organic light-emitting diodes.

Yet still another object of this invention is to provide a process for the microencapsulation of phosphor particles to produce microencapsulated phosphor particles having improved impermeability to moisture.

Yet still another object of this invention is to provide a process for the microencapsulation of phosphor particles to produce microencapsulated phosphor particles having extended release capabilities.

These and other objects, features and advantages of this invention will become apparent from the following detailed description.

BRIEF DESCRIPTION OF THE DRAWINGS

FIG. 1

FIG. 1 is a chart showing the effect of exposure (measured in hours) on brightness (measured in foot lamberts) of microencapsulated electroluminescent phosphors and electroluminescent phosphors which have not been microencapsulated.

With reference to FIG. 1, when tested in a humidity cabinet for 1,000 hours, lamps containing phosphors that have been microencapsulated according to this invention showed only 34% degradation, which is 60% less degradation than shown by electroluminescent lamps containing phosphors that have not been encapsulated.

In addition, when electroluminescent lights containing phosphors that have been microencapsulated according to this invention and incandescent lighting were tested as runway lights, the electroluminescent lamps produced no halos or glare and could be seen almost 3 times farther away than the incandescent lighting. This same result was observed under artic conditions.

FIG. 2

FIG. 2 is a graphical representation of the relation between capsule quality and percent hydrolysis as applied to poly(ethylene-vinyl acetate), partially hydrolyzed. For reasons not entirely understood, the change in quality with change of percent hydrolysis is quite pronounced and remarkable. At hydrolysis of less than about 38 percent, the separated phase prepared according to established liquid-liquid phase separation techniques is not adequately viscous to form useful capsule walls, and the walls which are formed are sticky and generally unmanageable in attempts to isolate the capsules. Capsules made using materials having less than 38 percent hydrolysis have a tendency to agglomerate during the microencapsulation process, because a lack of vinyl alcohol groups prevents adequate cross-linking across hydroxyl groups.

At hydrolysis of greater than about 55 percent, the separated phase is too viscous and exists as a semi-solid, stringy, precipitous phase. The change from "good" to "no-good" is abrupt and appears to be complete within a few percent.

At hydrolysis between about 38 and about 46 percent, quality capsules can be prepared with the quality improving as 43 percent hydrolysis is approached.

Between about 42 and about 53 percent hydrolysis, the capsule quality is excellent for this invention, and the capsules are particularly suited for containing phosphors, polar liquids and other substance particles for extended periods of time.

From hydrolysis of about 53 to 54 or 55 percent, capsule quality declines rapidly, and at a hydrolysis of about 56 percent, quality capsules can no longer be successfully manufactured.

As represented in FIG. 2, at hydrolysis from about 44 to about 46 percent, the capsule quality is at a maximum for the present invention. The exact capsule quality values for this range of hydrolysis has not been specifically determined but, as represented in FIG. 2, is significantly improved over hydrolysis below this range.

DETAILED DESCRIPTION OF THE INVENTION

The present invention relates to microencapsulated particles, especially microencapsulated phosphor particles, which are manufactured by a process that comprises the steps of:

mixing a film forming, cross-linkable, hydrolyzed polymer and an organic, nonpolar solvent for the polymer, wherein the solvent is not a solvent for particles of the substance;

agitating the mixture to form a solution of the polymer in the solvent;

adding particles of the substance to the solution under conditions of continuing agitation, wherein the substance particles are dispersed in the solution;

inducing a phase separation of the solution, wherein the polymer is separated from the solution and a film-like sheath of the polymer is formed and coated on each substance particle; and adding a cross-linking agent to the solution under conditions of continuing agitation, wherein the film-like sheath on each substance particle cross-links and hardens around each substance particle.

The microencapsulated substance particles produced according to the process of this invention have improved impermeability to moisture as compared to substance particles that are microencapsulated with other film-forming polymers according to the prior art.

As stated above, this invention will be described in detail with specific reference to phosphor particles, but this invention can also be effectively used to microencapsulate other substance particles as disclosed above.

The microencapsulated phosphors of the present invention comprise a core formed of a phosphor, typically in particulate form, and a film-like sheath surrounding and enclosing the core. The sheath comprises a hydrolyzed, cross-linked polymer that is sufficiently impermeable to moisture (especially water) to protect the phosphor from deteriorating exposure to moisture, but the cross-linked polymer is sufficiently permissive to the transmission of illuminating energy to activate the phosphor to a luminescent state. Thus, the microencapsulates of the present invention are especially adapted for use in luminescent applications.

In the method of the present invention, phosphor particles are mixed with a film-forming polymer and a liquid vehicle that is a solvent for the polymer but not for the phosphor particles. The mixture is agitated to dissolve the polymer in the liquid vehicle and to disperse the phosphor particles throughout the solution. A coacervation process is carried out to induce phase separation of the solution to separate the polymer from the liquid vehicle and to coat film-like sheaths of the polymer on the phosphor particles. The polymer sheaths surrounding the phosphor particles are then cross-linked to harden the polymer and render the polymer sheaths sufficiently impermeable to protect the phosphor particles from deteriorating exposure to moisture. The polymer-encapsulated phosphor particles are recovered from solution, washed and then dried if necessary.

Upon recovery of the phosphor capsules from the process, preferably the polymer sheaths are contacted with a halogenated hydrocarbon to cause the polymer sheaths to coat the phosphor particles to enhance the water-impermeability of the polymer sheaths. Preferred halogenated hydrocarbons are 1,1,2-trichloro-1,2,2-trifluoroethane and dibromotetrafluoroethane.

The Film-Forming, Cross-Linkable, Hydrolyzed Polymer

The polymer should be substantially dielectric, preferably with a dielectric constant less than about 2.2, preferably in the range of from about 1.8 to about 2.2. Various polymers may be utilized to form the protective film-like sheath of the microencapsulates. A preferred polymer is a hydrolyzable, cross-linkable ethylene-vinyl acetate copolymer. For certain applications, the polymer should be pyrolyzable.

A preferred film-forming polymer for use in the present invention is a poly (ethylene-vinyl acetate) containing about 60 to about 88 mol percent ethylene and having about 38 to about 55 percent (preferably between about 42 and about 46 percent) of the vinyl acetate groups hydrolyzed to vinyl alcohol groups to provide reaction sites for cross-linking. A preferred liquid vehicle for dissolving the polymer is toluene.

The polymeric capsule wall material can be any film-forming polymeric material that wets the phosphor core material. The capsule wall material preferably is partially hydrolyzed poly(ethylene-vinyl acetate) in which some of the vinyl acetate groups are hydrolyzed to form vinyl alcohol groups in order to provide reaction sites for subsequent cross-linking. The degree of hydrolysis for the poly (ethylene-vinyl acetate) wall-forming material can be within the relatively broad range of about 38 to about 55 percent, preferably within the range of about 44 to about 46 percent.

Thus, the partially hydrolyzed copolymers of ethylene and vinyl acetate contain ethylene groups, vinyl acetate groups, and vinyl alcohol groups, and can be represented by the general formula:

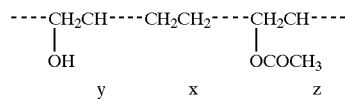

wherein x, y and z represent mol fractions of ethylene, vinyl alcohol and vinyl acetate, respectively. With respect to the degree of hydrolysis, the mol ratio of the vinyl alcohol groups to the sum of vinyl alcohol groups and the vinyl acetate groups present is about 0.15 to about 0.7. The amount of ethylene groups present is also important and can be about 60 to about 88 mol percent. Stated another way, the mol ratio of ethylene groups to the sum of ethylene groups, vinyl alcohol groups and vinyl acetate groups can be about 0.6 to about 0.88.

The partially-hydrolyzed poly(ethylene-vinyl acetate) suitable for practicing the present invention has a molecular weight of about 50,000 and a melt index (using a 2160 gram force at 190° C., for 10 minutes) of about 5 to about 70, preferably a melt index of about 35 to about 45. The molecular weight of the copolymer is not overly critical, except that if the molecular weight is too high, the copolymer will be relatively insoluble in the liquid vehicle that forms a major portion of the microencapsulation system. If the molecular weight of the copolymer is too low, phase separation may be difficult to induce during microencapsulation. Other suitable polymeric wall materials are the poly (vinyl-formal) polymers, poly(vinyl-butyral) polymers, alkylated cellulose (e.g., ethyl cellulose), acylated cellulose (e.g., cellulose acetate butyrate) and the like.

The Organic, Nonpolar Solvent

Typical illustrative water-immiscible liquids which can serve as liquid vehicles for the present process are solvents for the polymeric wall material and include the liquid aromatic hydrocarbons such as toluene, xylene, benzene, chlorobenzene and the like; and the liquid halogenated hydrocarbons such as trichloroethylene, tetrachloroethylene, carbon tetrachloride, methyl chloride and the like. Also suitable are solvents such as cyclohexanol, methyl isobutyl ketone, 1-methyl-2-pyrrolidone, butanol and the like.

The Substance Particles to be Microencapsulated

Preferably, the phosphor particles utilized in the present invention are in micro-particulate form, generally in the range of from about 1 to about 100 microns in cross-sectional dimension, preferably from about 5 to about 50 microns. The phosphor particles, the polymer and the liquid vehicle are relatively proportioned in forming the initial mixture so that the liquid vehicle constitutes the major component of the system and the polymer constitutes the smallest component of the system.

As stated above, the microencapsulates produced in accordance with the present invention have a core comprised of a phosphor particle encapsulated by a protective wall or sheath of a water-impermeable polymer material. Such microencapsulates are useful for illuminating road signs, intersections, house numbers, instrument panels, aircraft interiors, watch dials, calculator displays, cathode ray tubes, etc.

Depending on which phosphor is microencapsulated, the microencapsulates may be activated to their phosphorescent state by the application of electric current, impacted by electrons, absorption of electromagnetic radiation or by other activating means.

Typical phosphors include oxygen-dominated phosphors such as:

| | | |
|---|---|---|
| CaWO$_4$:Pb | MgWO$_4$ | Zn$_2$SiO$_4$:Mn |
| CaSiO$_3$:Pb, Mn | (MgO)$_x$(As$_2$O$_5$):Mn | Ca$_5$F(PO$_4$)$_3$: Sb, Mn |
| Ca$_5$Cl(PO$_4$)$_3$: Sb, Mn | BaSi$_2$O$_5$:Pb | Ca$_3$(PO$_4$)$_2$:Tl |
| SrHPO$_4$Sn | Y$_2$O$_3$:Eu(III) | YVO$_4$:Eu |
| Zn$_2$GeO$_4$:Mn | (BaZnMg)$_3$Si$_2$O$_7$ | | diamond-lattice phosphors, such as sulfides, selenides and tellurides of zinc, cadmium and mercury, e.g., ZnS:AgCl; ZnS:CuCl; ZnS:MnCl and ZnS activated by other activators such as Mn(II), P, As, Sb, V, Fe and Ti, with coactivators such as the halogens, Al, Ga and In, and ZnS activated by combinations of the rare earths with either Ag or Cu; CdS with the same activators and coactivators described above for ZnS; alkaline-earth sulfides, e.g. CaS, SrS, etc., containing europium, cerium, copper, manganese, samarium, or bismuth, SiC, AiN, GaP; and organic phosphors such as stilbene, naphthalene, anthracene and phenanthrene.

Phosphors are discussed in detail in Kirk-Othmer, *Encyclopedia of Chemical Technology*, John Wiley & Sons, (2 ed. 1967) at pages 616–631, which discussion is incorporated by reference into the present application. A discussion of the theoretical aspects of phosphors and a listing of certain common phosphors and their properties are found in Theculis, *Encyclopedic Dictionary of Physics*, (Pergamon Press, Oxford 1962) at pages 368–372, which discussion is incorporated by reference into the present application.

When one desires to excite the microencapsulated phosphors by electroluminescence (which is defined as the direct conversion of electrical energy into light energy by means of radiative recombination of electron and hole currents), zinc sulfide (specially prepared with a copper activator in which part of the copper ends up as a second phase of copper sulfide) is preferred as a core material. The emission of the electroluminescent process is similar to the photoluminescence observed under ultraviolet excitation. Flexible electroluminescent lamps with a thickness of less than 1/32 in. have been utilized in many applications including readouts, instrument panel illumination, signs markers, etc.

For a comprehensive review of electroluminescence, see H. F. Ivy, IRE Trans. Electron Devices 6, 203 (1959); *J. Electronchem. Sec.* 108, 590 (1961); *Electrochem. Technol* 1, 42 (1963); H. K. Henisch, *Electroluminescence*, Pergamon Press, New York, 1962; and H. F. Ivey, *Electroluminescence and Related Effects*, Academic Press, Inc., New York, 1963. Electroluminescence has also been observed in single crystals of AnS:Cu; ZnTe:Cu; SiC; GaP; and GaAs, among other compounds. In many of these examples, the excitation is attributed to carrier injection in a p-n junction.

The microencapsules will typically be supported in a matrix in which the media of the matrix surrounding the phosphor particles should have a dielectric constant in the range of about 10 to about 20 in order for the phosphors to be activated by an electric field.

Upon application of alternating current to the substrate and cover of a typical sign, an electromagnetic field is produced, thereby subjecting the phosphor particles within the microencapsules in the supporting matrix to the resultant electromagnetic wave energy and causing the phosphors to luminesce. This electroluminescence of the phosphor particles in the microencapsulates creates an illuminated display in the pattern of the message which those persons skilled in the art will recognize and understand is readily visible at considerable distances and under conditions such as fog, rain, snow, etc. For displays to be used in environments where a ready source of alternating current may not be available, electricity in direct current form, such as from a battery, may be supplied to the substrate and cover through an inverter for converting the electrical energy to alternating current.

The microencapsulated phosphors of this invention can also be deposited on a screen, as in a cathode ray tube, after which the polymer material of the wall or sheath can be destroyed, such as by pyrolyzing or burning. The results are unencapsulated phosphors deposited on the screen. This method of depositing phosphor particles may be useful where the phosphors are deposited in a controlled manner. In this instance, the wall material must be capable of being destroyed by pyrolysis at relatively low temperatures that do not adversely affect the phosphors. The ethylene-vinyl acetate copolymer, as well as other alternative polymers, is suitable for this purpose.

Basically, microencapsulates that contain phosphor particles can be produced by intermixing, (a) a phosphor, (b) a film-forming polymeric material and (c) a water-immiscible liquid vehicle capable of dissolving the polymeric material but not the phosphor. In a preferred embodiment, the phosphor is in the form of phosphor particles, which have average diameters in the range of about 1 micron to about 100 microns, preferably in the range of about 5 microns to about 50 microns.

The phosphor material can be microencapsulated in liquid form, and this is a useful method of utilizing some organic phosphors. The produced mixture is agitated to disperse the phosphor particles as individual minute core-forming entities throughout the liquid vehicle to form an agitated system in which the liquid vehicle constitutes the major component of the system. The polymeric film-forming material is then dissolved in the liquid vehicle. Next, phase separation is induced within the agitated system to separate the polymeric material from the liquid vehicle and to form film-like sheaths of the polymeric material around the phosphor cores. Next, the polymeric material in the sheaths is cross-linked to form protective walls around the phosphor cores. Finally, the protective walls may be contacted with a halogenated hydrocarbon for a time period sufficient to enhance the resistance of the walls to water, and are then washed and dried.

A preferred process for microencapsulating phosphor particles, such as zinc sulfide doped with copper, includes subjecting the phosphor particles to a coacervative microencapsulation process which is of the liquid-liquid phase separation type, utilizing an organic liquid vehicle and a partially hydrolyzed ethylene-vinyl acetate copolymer as the film-forming wall material. The film-like polymer wall of the microencapsule formed by this process is subsequently hardened by cross-linking and can be contacted with a low boiling hydrocarbon to enhance resistance to water. Preferably, the microencapsule entities are then treated with a finely divided silica gel to improve their resistance to aggregation during drying and filtration.

Phase Separation of the Solution

The present invention contemplates that phase separation may be induced in various ways, typically by introducing into the mixture a phase separation-inducing material. For example, a complementary polymeric material having less affinity for the phosphor particles than for the film-forming polymer may be dissolved in the liquid vehicle so that the film-forming polymer is caused to preferentially coat the phosphor particles.

Alternatively, a non-polymeric material that is not a solvent for the film-forming polymer or the phosphor particles may be utilized as the phase separation-inducing material. In another alternative, phase separation may be induced, with or without introducing any phase separation-inducing material into the system, by adjusting the temperature of the system to a temperature at which the film-forming polymer becomes generally insoluble in the liquid vehicle. As will be understood, this step in the process may involve either cooling or heating the system, depending upon the particular film-forming polymer being utilized.

When used, a phase separation-inducing material may be introduced into the system either during or after the initial mixing step. As a further alternative, the film-forming polymer and the phase separation-inducing material may be initially mixed with one another and then mixed with the liquid vehicle and the phosphor particles.

Suitable phase separation-inducing materials for the present invention are polymeric materials that are soluble in the liquid vehicle and that exhibit in the system less affinity for the capsule core material than does the polymeric film-forming material, thereby causing the latter to deposit preferentially around the dispersed cores. In other words, the phase separation-inducing material is incompatible with the polymeric film-forming material. Illustrative phase separation-inducing materials of this type are polymeric materials such as silicone oils, e.g., polydimethyl siloxane, and the like; poly-olefins, e.g., polybutadiene having a molecular weight of about 8,000 to about 10,000; polybutene having a molecular weight of about 330 to about 780; unhydrolyzed ethylene-vinyl acetate copolymers; natural waxes; and the like. Polymeric materials of this general type are sometimes characterized in the art as "complementary polymeric materials."

Another type of phase separation-inducing material that can be utilized to initially form the microcapsule wall or sheath is a non-polymeric liquid that is a non-solvent for the polymeric film-forming material and the capsule core material, but is miscible with the liquid vehicle. Illustrative phase separation-inducing materials of the non-solvent type are the vegetable oils, e.g., the semi-drying oils such as cottonseed oil or corn oil, and the drying oils such as linseed oil, soybean oil and the like. Other illustrative materials of the non-solvent type are mineral oils, halogenated mineral oils, liquid saturated alicyclic hydrocarbons such as cyclohexane, cycloheptane, and the like, liquid, saturated straight-chain aliphatic hydrocarbons such as n-hexane, n-heptane and the like.

To bring about the phase separation and the attendant sheath or microcapsule wall formation, the film-forming polymeric material, the phase separation-inducing material and the solvent (which serves as the liquid vehicle of the system) can be combined in any convenient sequence. Preferably, a dilute solution of the polymeric film-forming material is formed first, and the liquid-liquid phase separation is then effected by the addition of the phase separation-inducing material at an elevated temperature of about 30° C. or higher.

However, the order of addition can be reversed. Alternatively, the film-forming polymeric material and the phase separation-inducing material can be combined with the liquid vehicle simultaneously.

The quantitative relationships of the film-forming polymeric material and the phase separation-inducing material depend on the particular materials that are used and also on the thickness of the protective wall or film-like sheath desired for the phosphor core of the capsule. In general, the film-forming polymer constitutes about 0.5 to about 5 percent (preferably about 1 to about 2 percent) of the total system volume, the phase separation inducing material constitutes about 0.5 to about 25 percent (preferably about 8 to about 12 percent) of the total system volume, and the discrete capsule core material entities constitute about 2 to about 30 percent (preferably about 15 to about 20 percent) of the total system volume. In this manner, the resultant microencapsules of the present invention have a relatively high phase ratio of the phosphor core to the protective polymeric wall or sheath, typically in the range of from about 3:1 to about 20:1, preferably within the upper end of that range.

Alternatively, phase-separation can be induced within the system by first forming a solution of the polymeric film-forming material (i.e., the microcapsule wall-forming material) in the liquid vehicle at a predetermined dissolution temperature and thereafter changing the temperature of the resulting solution by heating or cooling to an insolubility temperature for at least a portion of the dissolved polymeric material. Usually, the solution temperature is lowered by at least about 10° C. to effect the microencapsule wall formation around the phosphor cores dispersed in the solution. However, in instances where the solubility of the polymeric material in the liquid vehicle decreases with increasing temperature, phase separation is induced by elevating the temperature of the polymeric material solution.

A combination of these phase separation inducing techniques can also be employed.

Cross-Linking of the Film-Forming, Cross-Linkable, Hydrolyzed Polymer

Suitable cross-linking agents useful for hardening the microcapsules according to the present invention include the diisocyanates or polyisocyanates, e.g., toluene diisocyanate, with or without a catalyst present. Particularly preferred is a toluene diisocyanate-trimethylol propane adduct, usually dissolved in an aliquot of the liquid vehicle. Also suitable as cross-linking agents are the diacid halides such as malonyl chloride, oxalyl chloride, sulfonyl chloride, thionyl chloride and the like, and difunctional hydrides. Another grouping of suitable hardening agents is illustrated by the alkali alkoxides such as the sodium, potassium, lithium and cesium methoxides, ethoxides, propoxides and the like.

To effect the desired chemical hardening of the formed sheath, and thereby provide the protective capsule wall, the cross-linking or hardening agent can be dissolved in an aliquot of the liquid vehicle or another compatible solvent and then added to the suspension of sheathed capsule cores. Cross-linking can then be carried out at a temperature of about 0° C. to about 50° C. for a time period of about 5 minutes to about 20 hours, depending on the cross-linking agent that is used. The cross-linking time period when using the diacid halides can be about 5 to about 15 minutes, and when using the diisocyanates can be about 5 to about 15 hours, depending on reaction conditions.

The microencapsule sheath can also be hardened or cross-linked by exposing the sheath to high energy ionizing radiation such as accelerated electrons, X-rays, gamma rays, alpha particles, neutrons and the like.

Permeability of the protective wall of the microencapsules is dependent to a considerable extent on the degree of cross-linking that has been effected, and can be built into the protective wall as desired for a given end use by controlling the degree of cross-linking.

Cross-linking of the polymer may also be accomplished in differing manners. Typically, a cross-linking agent is added to the system, with preferred cross-linking agents being diisocyanates, polyisocyanates, diacid halides, difunctional hydrides and alkali alkoxides. Alternatively, cross-linking can be induced by applying radiation to the system.

Microencapsules of various sizes can be manufactured when practicing the present invention, and these sizes can extend from an average diameter of about 1 micron or less to about several thousand microns and more. The usual size for the produced microencapsules is about 1 micron to about 15,000 microns in average diameter, and preferably is in the range of about 5 microns to about 2,500 microns. Similarly, the microencapsules can be manufactured to contain varying amounts of phosphor core material that can constitute up to about 99 percent or more of the total weight of each microencapsule. Preferably, the core material constitutes about 50 to about 97 percent of the total weight of each microencapsule.

To illustrate the process of this invention, a solution of a liquid vehicle such as toluene and a film-forming polymeric material comprising partially hydrolyzed ethylene-vinyl acetate copolymer (HEVA), having from about 38 percent to about 55 percent, and preferably from about 44 percent to about 46 percent, of the vinyl acetate groups hydrolyzed to form vinyl alcohol groups, is prepared at an elevated dissolution temperature which is suitably above about 70° C., and preferably from about 75° C. to about 100° C. The produced solution is then ready to receive the phosphoric core material. Preferably, the solution is allowed to cool to a dispersion temperature of about 30° C. to about 65° C. Phosphor particles having an average diameter in the range of about 5 to about 50 microns, are then added to the HEVA-toluene solution with vigorous agitation so as to disperse the phosphor particles as core material entities throughout the HEVA-toluene solution.

Next, liquid-liquid phase separation of the HEVA copolymer from the toluene solution is induced by adding a phase separating inducer, such as cottonseed oil, and then cooling the resulting mixture to a phase-separation temperature in the range from about 15° C. to about 50° C., preferably from about 20° C. to about 30° C., while continuing the agitation to maintain the dispersed core material phosphor particles. However, the phase separation inducer can also be added earlier, before the phosphor cores. When phase separation is induced within the system, the wall-forming HEVA copolymer material separates out as another discontinuous phase, i.e., a third phase, that preferentially wets the phosphor cores and forms a sheath or capsule wall. This third phase is a relatively concentrated solution or gel of the polymeric material, is more viscous than the continuous phase, and in addition, is of sufficiently high viscosity to maintain a substantially continuous sheath around the discrete phosphor cores despite the shearing forces incident to the forces required to maintain these entities in dispersion.

Next, a solution of a cross-linking agent, such as toluene diisocyanate (TDI) adducted with trimethylol propane in toluene, is added to the cooled admixture to cross-link, and thus to harden, the HEVA sheath which is deposited around the phosphor cores as a result of the addition of the phase-separation inducing cottonseed oil. After TDI adduct addition, the produced mixture is further cooled to a temperature in the range of about 0° C. to about 20° C. and is then permitted to warm to ambient temperature while being continuously agitated. Agitation is continuous until cross-linking is completed. Thereafter, the produced microencapsules are recovered, washed and dried.

Then, if desired, the microcapsules are contacted with a halogenated hydrocarbon, such as by suspending the microcapsules in 1,1,2-trichloro-1,2,2-trifluroethane. This wash contracts the sheath or wall of the microencapsule and prevents aggregation of the microencapsules. Finally, the microencapsules are dried, and preferably treated with a silica gel in the form of micron-size particles to prevent aggregation of the microencapsules.

The present invention is further illustrated by the following examples that are illustrative of certain embodiments designed to teach those of ordinary skill in the art how to practice this invention and to represent the best mode contemplated for carrying out this invention.

EXAMPLE 1

Sixty grams of a hydrolyzed ethylene-vinyl acetate copolymer (HEVA, sold under the trademark Japan 8 by Mitsui Corporation) having 44–52 percent of its vinyl acetate groups hydrolyzed to vinyl alcohol groups and having a melt index of 35–37, is added to 2400 ml of toluene in a 4 liter beaker equipped with a 4-inch turbine impeller on a variable speed stirring motor. The HEVA copolymer is dissolved in the toluene by heating the solution to 85° C. and stirring for 15 minutes. Next, the heat is removed, and the temperature is allowed to drop to 58° C. At that time, 900 grams of green phosphor particles, having average diameters in the range of about 10 microns to about 40 microns, are added to the solution of the HEVA copolymer in toluene with vigorous agitation with the stirrer increased to 480 rpm to disperse the phosphor particles substantially uniformly throughout the toluene solution. At about the same time, cottonseed oil is added to the toluene solution (in an amount sufficient to form an 11 percent by weight solution of cottonseed oil) to induce liquid-liquid phase separation. At 42° C., the stirrer is reduced to 430 rpm, and the beaker is placed in an ice bath. The produced mixture is then cooled to about 22° C. while agitated sufficiently to maintain the dispersed phosphor particles in suspension.

A solution of 71.4 grams of a toluene diisocyanate adducted with trimethylol propane in toluene (sold under the trademark Mondur CB-75 by Mobay Chemicals) is then added to the cooled mixture to cross-link, and thus to harden the HEVA sheath that is deposited around the core material as a result of the addition of cottonseed oil. After the addition of the diisocyanate adduct, the produced mixture is further cooled to about 10° C. and then is permitted to warm to ambient temperature while continually being agitated. Agitation is continued until cross-linking is completed.

Thereafter, the produced microencapsules are recovered by filtration, washed with toluene and then suspended in 1250 ml of 1,1,2-trichloro-1,2,2- trifluroethane for five to ten minutes to contract the capsule wall or sheath to improve the wall's resistance to water and to prevent aggregation of the microencapsules during filtration and drying. The suspension is repeated three more times, and the microncapsules are then filtered off and washed again with a small amount of 1,1,2-trichloro-1,2,2-trifluroethane. The capsules are next mixed with a finely divided silica gel (sold under the trademark Syloid 74 by W. R. Grace Co.) to aid in preventing aggregation of the microcapsules. The Syloid/microencapsule mixture is passed through a 500 micron sieve and then through a 106 micron sieve, and then spread out on a tray to dry. The yield is about 80 percent.

EXAMPLE 2

The process of Example 1 is successfully repeated using 900 grams of blue phosphor particles having average diameters in the range of about 10 microns to about 40 microns.

EXAMPLE 3

The process of Example 1 is successfully repeated using 600 grams of yellow phosphor particles having average diameters in the range of about 10 microns to about 40 microns.

EXAMPLE 4

The process of Example 1 is successfully repeated using the hydrolyzed ethylene-vinyl acetate copolymer, but with 44–46 percent of its vinyl acetate groups hydrolyzed to vinyl alcohol groups.

As will be readily understood by those persons skilled in the art, the present invention is susceptible of broad utility and applications. Many embodiments and adaptations of the present invention other than those described in this application, as well as many variations and modifications, will be apparent from or reasonably suggested by the present invention and the foregoing description without departing from the substance or scope of the present invention. The foregoing disclosure is not intended, and should not be construed, to limit the present invention or otherwise to exclude any other embodiments, adaptations, variations and modifications, the present invention being limited only by the spirit and scope of the invention as defined by the following claims.

What is claimed is:

1. A process for microencapsulating a substance, wherein the process comprises the steps of:
  A. mixing a film-forming, cross-linkable, hydrolyzed polymer and an organic, nonpolar solvent for the polymer, wherein the solvent is not a solvent for particles of the substance; wherein the substance is a polymer light-emitting diode or an organic light-emitting diode;
  B. agitating the mixture to form a solution of the polymer in the solvent;
  C. adding particles of the substance to the solution under conditions of continuing agitation, wherein the substance particles are dispersed in the solution;
  D. inducing a phase separation of the solution, wherein the polymer is separated from the solution and a film-like sheath of the polymer is formed and coated on each substance particle; and
  E. adding a cross-linking agent to the solution under conditions of continuing agitation, wherein the film-like sheath on each substance particle cross-links and hardens around each substance particle,
  whereby the microencapsulated substance particles have improved impermeability to moisture as compared to substance particles that are microencapsulated using other film-forming polymers.

2. A process as defined claim 1 wherein the substance is a phosphor.

3. A process as defined by claim 1 wherein the substance is a polymer light-emitting diode.

4. A process as defined by claim 1 wherein the substance is a organic light-emitting diode.

5. A process as defined by claim 1 wherein the film-forming, cross-linkable, hydrolyzed polymer is a poly(ethylene-vinyl acetate).

6. A process as defined by claim 1 wherein the organic, nonpolar solvent is toluene.

7. A process as defined by claim 1 wherein the phase separation is induced by addition of cottonseed oil, corn oil, linseed oil, soybean oil or a mixture of two or more of these oils.

8. A process as defined by claim 1 wherein the cross-linking agent is a diisocyanate or polyisocyanate.

9. A process as defined by claim 8 wherein the cross-linking agent is toluene diisocyanate.

10. A process as defined by claim 8 wherein the cross-linking agent is toluene diisocyanate-trimethyol propane adduct.

11. A process as defined by claim 1 wherein the polymer is hydrolyzed from about 42 to about 46 percent.

12. A microencapsulated substance having improved impermeability to moisture, wherein the microencapsulated substance is produced by a process that comprises the steps of:
   A. mixing a film-forming, cross-linkable, hydrolyzed polymer and an organic, nonpolar solvent for the polymer, wherein the solvent is not a solvent for particles of the substance; wherein the substance is a polymer light-emitting diode or an organic light-emitting diode:
   B. agitating the mixture to form a solution of the polymer in the solvent;
   C. adding particles of the substance to the solution under conditions of continuing agitation, wherein the substance particles are dispersed in the solution;
   D. inducing a phase separation of the solution, wherein the polymer is separated from the solution and a film-like sheath of the polymer is formed and coated on each substance particle; and
   E. adding a cross-linking agent to the solution under conditions of continuing agitation, wherein the film-like sheath on each substance particle cross-links and hardens around each substance particle,
   whereby the microencapsulated substance particles have improved impermeability to moisture as compared to substance particles that are microencapsulated using other film-forming polymers.

13. A microencapsulated substance as defined by claim 12 wherein the film-forming, cross-linkable, hydrolyzed polymer is a poly(ethylene-vinly acetate).

14. A microencapsulated substance as defined by claim 12 wherein the organic, nonpolar solvent is toluene.

15. A microencapsulated substance as defined by claim 12 wherein the phase separation is induced by addition of cottonseed oil, corn oil, linseed oil, soybean oil or a mixture of two or more of these oils.

16. A microencapsulated substance as defined by claim 12 wherein the cross-linking agent is a diisocyanate or polyisocyanate.

17. A microencapsulated substance as defined by claim 16 wherein the cross-linking agent is toluene diisocyanate.

18. A microencapsulated substance as defined by claim 16 wherein the cross-linking agent is a toluene diisocyanate-trimethyol propane adduct.

19. A microencapsulated substance as defined by claim 12 wherein the polymer is hydrolized from about 42 to about 46 percent.

20. A microencapusulated substance as defined by claim 12, wherein the substance is a phosphor.

21. A microencapsulated substance as defined by claim 12 wherein the substance is a polymer light-emitting diode.

22. A microencapsulated substance as defined by claim 12 wherein the substance is an organic light-emitting diode.

23. A process for microencapsulating phosphor particles, wherein the process comprises the steps of:
   A. mixing a film-forming, cross-linkable, hydrolyzed polymer and an organic, nonpolar solvent for the polymer, wherein the solvent is not a solvent for particles of the phosphor; wherein the phosphor is a polymer light-emitting diode or an organic light-emitting diode;
   B. agitating the mixture to form a solution of the polymer in the solvent;
   C. adding particles of the phosphor to the solution under conditions of continuing agitation, wherein the phosphor particles are dispersed in the solution;
   D. inducing a phase separation of the solution, wherein the polymer is separated from the solution and a film-like sheath of the polymer is formed and coated on each phosphor particle; and
   E. adding a cross-linking agent to the solution under conditions of continuing agitation, wherein the film-like sheath on each phosphor particle cross-links and hardens around each substance particle,
   whereby the microencapsulated phosphor particles have improved impermeability to moisture as compared to phosphor particles that are microencapsulated using other film-forming polymers.

24. A process as defined by claim 23 wherein the film-forming, cross-linkable, hydrolyzed polymer is a poly(ethylene-vinyl acetate).

25. A process by claim 23 wherein the organic, nonpolar solvent is toluene.

26. A process as defined by claim 23 wherein the phase separation is induced by addition of cottonseed oil, corn oil, linseed oil, soybean oil or a mixture or two or more of these oils.

27. A process as defined by claim 23 wherein the cross-linking agent is a diisocyanate or polyisocyanate.

28. A process as defined by claim 27 wherein the cross-linking agent is toluene diisocyanate.

29. A process as defined by claim 27 wherein the cross-linking agent is a toluene diisocyanate-trimethoyol propane adduct.

30. A process as defined by claim 23 wherein the polymer is hydrolyzed from about 42 to about 46 percent.

31. A process as defined by claim 1 wherein the steps are sequential.

32. A process as defined by claim 23 wherein the microencapsulated phosphor particles are useful in electroluminescent applications.

* * * * *